US010683888B2

(12) United States Patent
Turner et al.

(10) Patent No.: US 10,683,888 B2
(45) Date of Patent: *Jun. 16, 2020

(54) HYDRODYNAMIC BEARING ASSEMBLY AND METHOD OF ASSEMBLING THE SAME

(71) Applicants: Regal Beloit America, Inc., Beloit, WI (US); Regal Beloit Australia Pty Ltd., Rowville, Victoria (AU)

(72) Inventors: Matthew J. Turner, Rowville (AU); Greg Heins, Rowville (AU); Mark Thiele, Cape Woolamai (AU); Jason Jon Kreidler, Sheboygan, WI (US)

(73) Assignee: REGAL BELOIT AMERICA, INC., Beloit, WI (US)

( * ) Notice: Subject to any disclaimer, the term of this patent is extended or adjusted under 35 U.S.C. 154(b) by 20 days.

This patent is subject to a terminal disclaimer.

(21) Appl. No.: 16/141,500

(22) Filed: Sep. 25, 2018

(65) Prior Publication Data

US 2019/0024706 A1 Jan. 24, 2019

Related U.S. Application Data

(63) Continuation of application No. 15/418,179, filed on Jan. 27, 2017, now Pat. No. 10,113,582.

(51) Int. Cl.

*F16C 17/02* (2006.01)
*F16C 32/06* (2006.01)

(Continued)

(52) U.S. Cl.

CPC ............ *F16C 17/02* (2013.01); *B23P 15/003* (2013.01); *F16C 17/04* (2013.01); *F16C 17/246* (2013.01);

(Continued)

(58) Field of Classification Search

CPC .......... F16C 17/02; F16C 17/04; F16C 17/08; F16C 33/74; F16C 43/00; F16C 32/067;

(Continued)

(56) References Cited

U.S. PATENT DOCUMENTS 1,387,930 A 8/1921 Kingsbury et al.
1,666,521 A 4/1928 Allen (Continued)

FOREIGN PATENT DOCUMENTS

JP 03025156 A 2/1991

OTHER PUBLICATIONS

PCT Search Report for related application PCT/US18/15469 dated Mar. 7, 2018; 10 pp.

*Primary Examiner* — Marcus Charles
(74) *Attorney, Agent, or Firm* — Armstrong Teasdale LLP

(57) ABSTRACT

A hydrodynamic bearing assembly includes a first member including a first engaging surface. The first member is stationary in a non-operating mode of the bearing assembly and rotates about an axis in an operational mode of the bearing assembly. The first member includes a first bore and a shaft positioned within the first bore and including an end surface. The hydrodynamic bearing assembly also includes a second member including a second bore and a second engaging surface positioned adjacent the first engaging surface. The second member is stationary in both the non-operating mode and the operational mode of the bearing assembly. The hydrodynamic bearing assembly further includes a spacer member positioned within the second bore and is configured to engage the first member to define a first gap between the first engaging surface and the second engaging surface in the non-operational mode.

20 Claims, 6 Drawing Sheets

100
122
110
106
112
116
114
108
124

(51) Int. Cl.

| | |
|---|---|
| ***F16C 33/74*** | (2006.01) |
| ***F16C 43/00*** | (2006.01) |
| ***B23P 15/00*** | (2006.01) |
| ***F16C 17/24*** | (2006.01) |
| ***F16C 17/04*** | (2006.01) |

(52) U.S. Cl.
CPC .......... *F16C 32/0681* (2013.01); *F16C 33/74* (2013.01); *F16C 43/00* (2013.01); *F16C 2240/46* (2013.01)

(58) Field of Classification Search
CPC .............. F16C 32/0681; F16C 32/0692; F16C 2240/46; F16C 2300/04; F16C 2300/14; B23P 15/003
USPC ... 384/95, 99, 100, 105, 107, 113–114, 121, 384/129, 226, 246, 248
See application file for complete search history.

(56) References Cited

U.S. PATENT DOCUMENTS 2,102,534 A 12/1937 Howarth
3,001,136 A 9/1961 Rumpelein
3,186,774 A 6/1965 Wilcox
3,391,965 A 7/1968 Lindeboom
4,568,203 A 2/1986 Eddy
4,867,633 A 9/1989 Gravelle
5,049,045 A * 9/1991 Oklejas .................. B01D 61/06 417/365
5,076,716 A 12/1991 Mizobuchi
5,209,579 A 5/1993 Matake
5,358,339 A 10/1994 Konno et al.
5,564,836 A 10/1996 Ide
5,951,169 A * 9/1999 Oklejas ............... F16C 33/1065 384/123
5,980,114 A * 11/1999 Oklejas, Jr. ........... F04D 29/047 384/123
6,036,435 A * 3/2000 Oklejas ................ F16C 33/102 415/106
8,672,611 B2 3/2014 Larose
2005/0269436 A1 12/2005 Sawant et al.
2007/0160314 A1 7/2007 Richie et al.
2017/0240198 A1* 8/2017 Maniwa ................. B62D 1/184

* cited by examiner

HYDRODYNAMIC BEARING ASSEMBLY AND METHOD OF ASSEMBLING THE SAME

CROSS-REFERENCE TO RELATED APPLICATIONS

This application is a continuation of U.S. patent application Ser. No. 15/418,179, filed Jan. 27, 2017, and issued as U.S. Pat. No. 10,113,582, which is hereby incorporated by reference in its entirety.

BACKGROUND

The field of the disclosure relates generally to hydrodynamic bearings, and more specifically, to a hydrodynamic bearings assembly that improves service lifetime of the hydrodynamic bearing.

At least some known hydrodynamic bearings include a stationary member and a rotating member. In operation, the bearing load is supported by a thin layer of rapidly moving pressurized liquid or gas between opposing surfaces of the stationary and rotating members. Because the two members are separated by the layer of fluid in operation, there is no contact between the moving parts, and the bearing has lower friction, wear and vibration than many other types of bearings. Such bearings are frequently used in high load, high speed or high precision applications where ordinary ball bearings would have short life or cause high noise and vibration.

However, the opposing faces of the stationary and rotating members do contact each other both when the bearing is non-operational and also for a duration after rotation initialization before the rotating member lifts away from the stationary member. As such, during low speed rotation, the two members contact each other and cause large friction forces between the two faces. Such friction forces may shorted the service lifetime of the bearing and may also generate undesirable noise.

BRIEF DESCRIPTION

In one aspect, a hydrodynamic bearing assembly is provided. The hydrodynamic bearing assembly includes a first member including a first engaging surface. The first member is stationary in a non-operating mode of the bearing assembly and rotates about an axis in an operational mode of the bearing assembly. The first member includes a first bore and a shaft positioned within the first bore and including an end surface. The hydrodynamic bearing assembly also includes a second member including a second bore and a second engaging surface positioned adjacent the first engaging surface. The second member is stationary in both the non-operating mode and the operational mode of the bearing assembly. The hydrodynamic bearing assembly further includes a spacer member positioned within the second bore and is configured to engage the first member to define a first gap between the first engaging surface and the second engaging surface in the non-operational mode.

In another aspect, a method of assembling a hydrodynamic bearing assembly is provided. The method includes providing a first member having a first engaging surface. The first member is stationary in a non-operating mode of the bearing assembly and rotates about an axis in an operational mode of the bearing assembly. A first bore is defined through the first member and a shaft is coupled within the first bore and includes an end surface spaced from the first engaging surface. The method also includes positioning a second member having a second engaging surface adjacent the first member. The second member is stationary in both the non-operating mode and the operational mode of the bearing assembly. The method further includes coupling a spacer member within a second bore defined in the second member such that the spacer member engage the first member in the non-operational mode to define a first gap between the first engaging surface and the second engaging surface.

Although specific features of various embodiments may be shown in some drawings and not in others, this is for convenience only. Any feature of any drawing may be referenced and/or claimed in combination with any feature of any other drawing.

DETAILED DESCRIPTION

Figure 1:
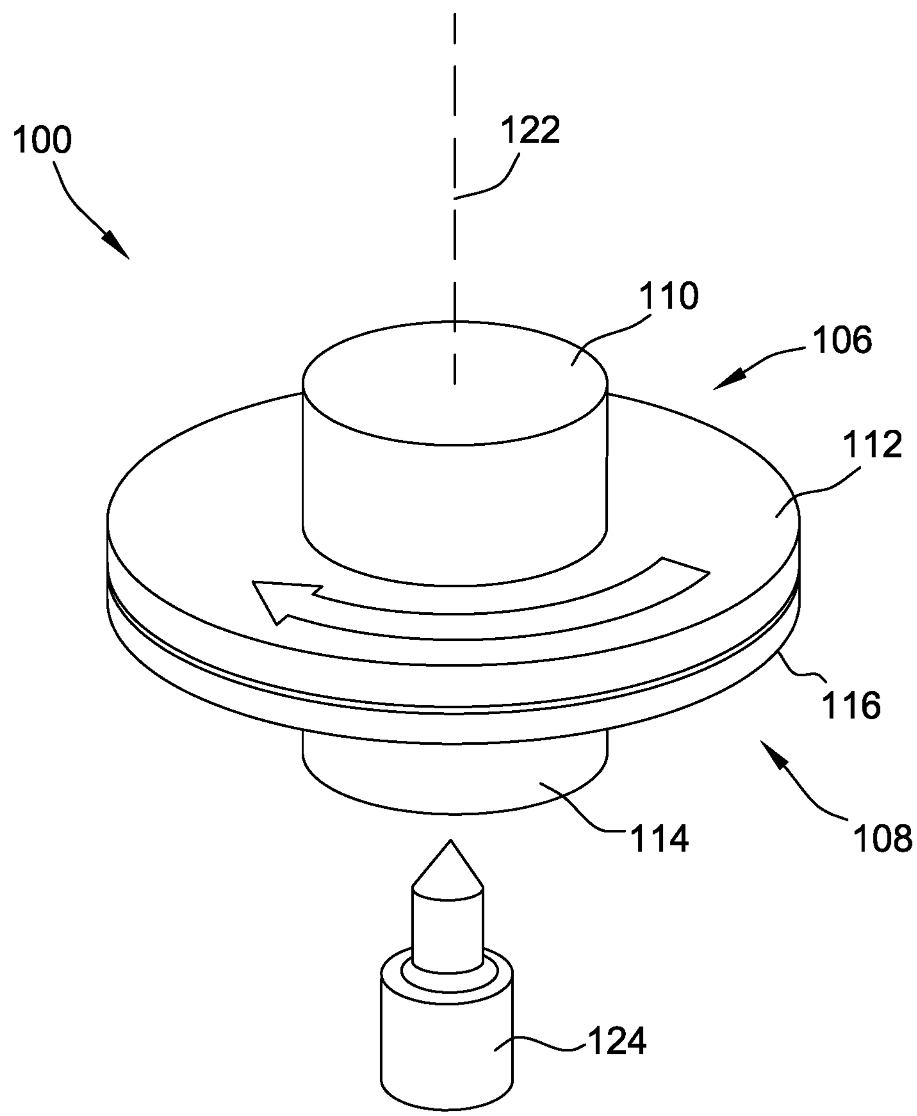
FIG. 1 is a perspective, partially exploded view of an exemplary hydrodynamic bearing assembly.
Figure 2:
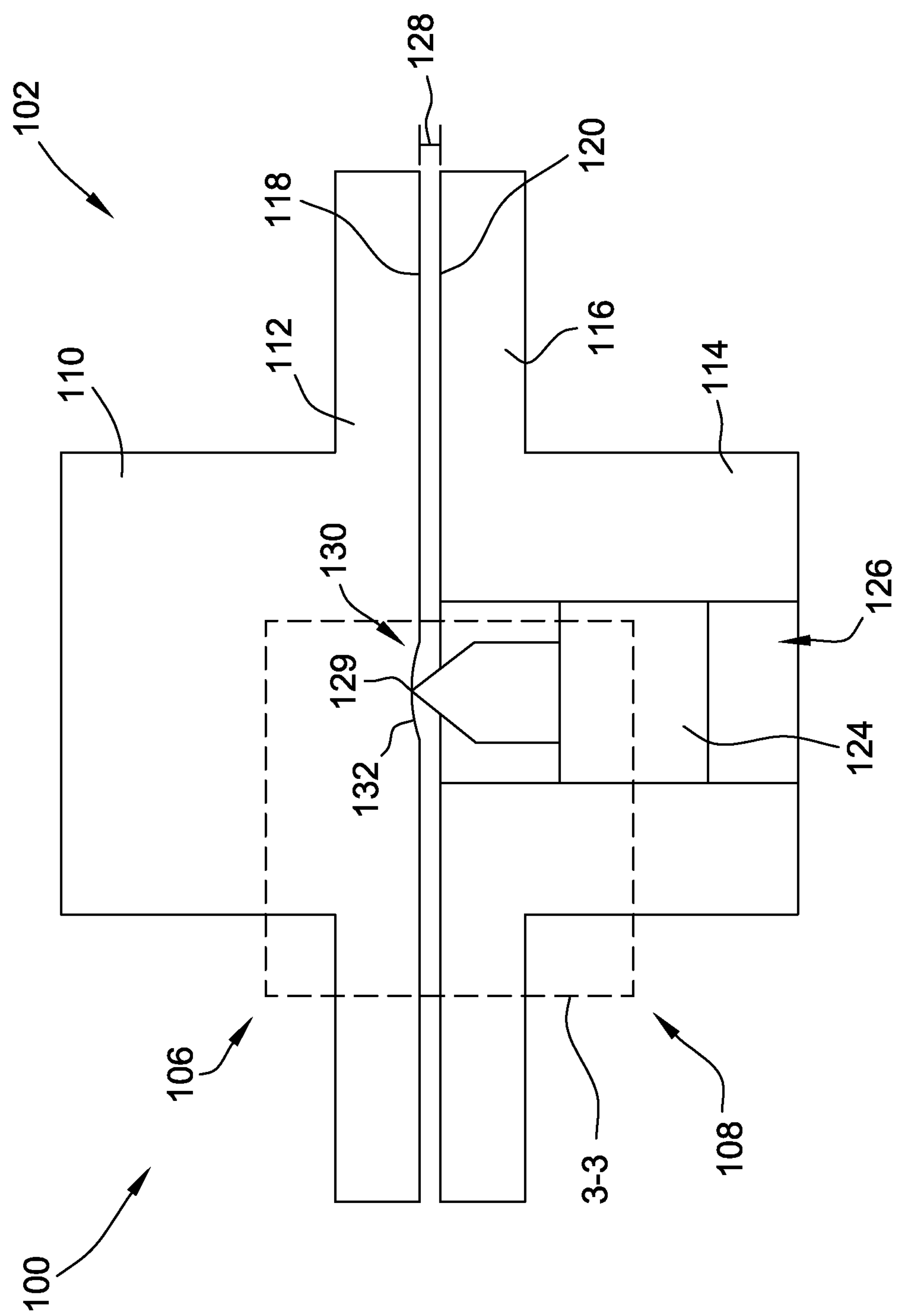
FIG. 2 is a cross-sectional view of the hydrodynamic bearing assembly shown in FIG. 1 in a non-operational mode.
Figure 3:
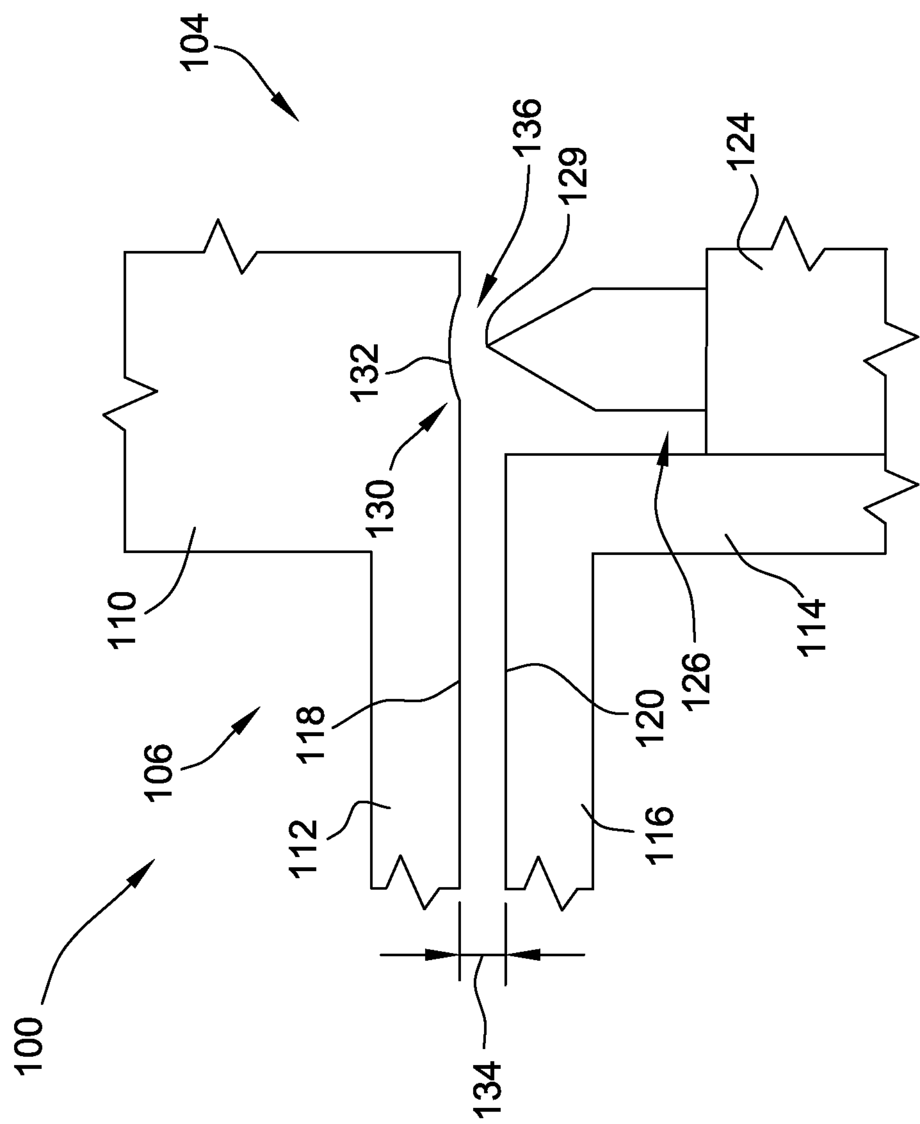
FIG. 3 is an enlarged cross-sectional view of the portion hydrodynamic bearing assembly indicated by box 3-3 in FIG. 2 in an operational mode.

FIG. 1 is a perspective, partially exploded view of an exemplary hydrodynamic bearing assembly 100, FIG. 2 is a cross-sectional view of hydrodynamic bearing assembly 100 in a non-operational mode 102, and FIG. 3 is an enlarged cross-sectional view of hydrodynamic bearing assembly 100 in an operational mode 104. In the exemplary embodiment, assembly 100 includes a first member 106 positioned adjacent to a second member 108. First member 106 includes a body portion 110 and a plate 112 coupled to body portion 110. Similarly, second member 108 includes a body portion 114 and a plate 116 coupled to body portion 114. Plate 112 includes a first engaging surface 118 that is positioned adjacent a second engaging surface 120 of plate 116. In the non-operational mode, both first member 106 and second member 108 are stationary. However, in the operational mode, first member 106 rotates about an axis 122, and second member 108 remains stationary. The rotation of first member 106 pressurizes a fluid (not shown) between surfaces 118 and 120 and causes first member 106 to move axially away from second member 108.

In the exemplary embodiment, assembly 100 also includes a spacer member 124 coupled within a bore 126 defined through body 114 and plate 116. As shown in FIG. 2, spacer member 124 engages first member 106 to define a first gap 128 between surfaces 118 and 120 in the non-operational mode. More specifically, a tip 129 of spacer member 124 engages first engaging surface 118 of first member plate 112 such that spacer member 124 and surface 118 contact each other when assembly 100 is in the non-operational mode. Even more specifically, first engaging surface 118 includes a recess 130 formed therein, and spacer tip 129 contacts a surface 132 of recess 130 in the non-operational mode. As such, when members 106 and 108 are stationary, in the non-operational mode, spacer member 124 spaces apart engaging surfaces 118 and 120 such that gap 128 is defined therebetween. Accordingly, spacer member 124 receives the axial load within bearing assembly 100 rather than the axial load being imparted onto engaging surfaces 118 and 120. In the exemplary embodiment, spacer member 124 includes a jewel bearing. Alternatively, spacer member 124 includes any type of spacer that facilitates operation of bearing assembly 100 as described herein.

When bearing assembly 100 shifts from non-operational mode 102 to operational mode 104, first member 106 begins to rotate about axis 122. Gap 128, created by spacer member 124, prevents first engaging surface 118 from contacting and rubbing against second engaging surface 120. Furthermore, spacer member 124 supports first member 106 for a short duration in operational mode 104 until first member 106 reaches a speed that causes first member to move farther away from second member 108. As such, spacer member 124 keeps engaging surface 118 and 120 separate during initial start-up of bearing assembly 100, thereby reducing initial spinning torque and wear on plates 112 and 116 caused by friction in some known bearing assemblies.

As described herein, in the operational mode 104, rotation of first member 106 pressurizes the fluid within bearing assembly 100, between surfaces 118 and 120, and causes first member 106 to "lift" or move away from second member 108. As such, a second gap 134 is formed between first engaging surface 118 and second engaging surface 120 that is larger than first gap 128 (shown in FIG. 2). Furthermore, the rotational lifting of first member 106 also defines a third gap 136 between spacer member 124 and first member 106. More specifically, third gap 136 is defined between spacer member 124 and first engaging surface 118. Even more specifically, third gap 136 is defined between spacer member tip 129 and surface 132 of recess 130 formed in first engaging surface 118.

In the exemplary embodiment, in operational mode 104, recess 130 and first engaging surface 118 of first member 106 are spaced away from tip 129 of spacer member 124 and second engaging surface 120 of second member 108, respectively. As such, in operational mode 104, the axial load is carried by first member 106, second member 108, and the pressurized fluid between engaging surfaces 118 and 120.

Figure 4:
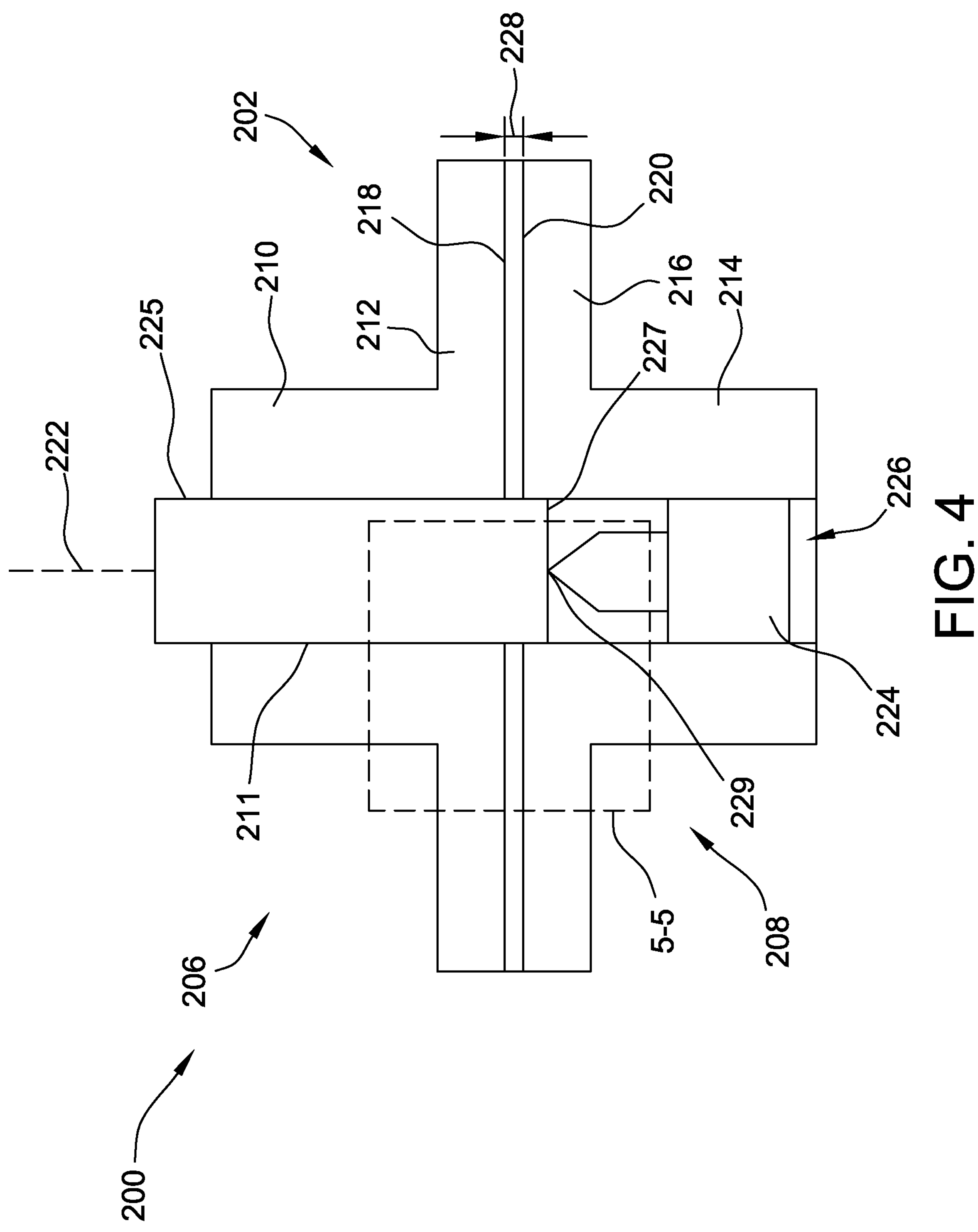
FIG. 4 is a cross-sectional view of an alternative embodiment of a hydrodynamic bearing assembly in a non-operational mode.
Figure 5:
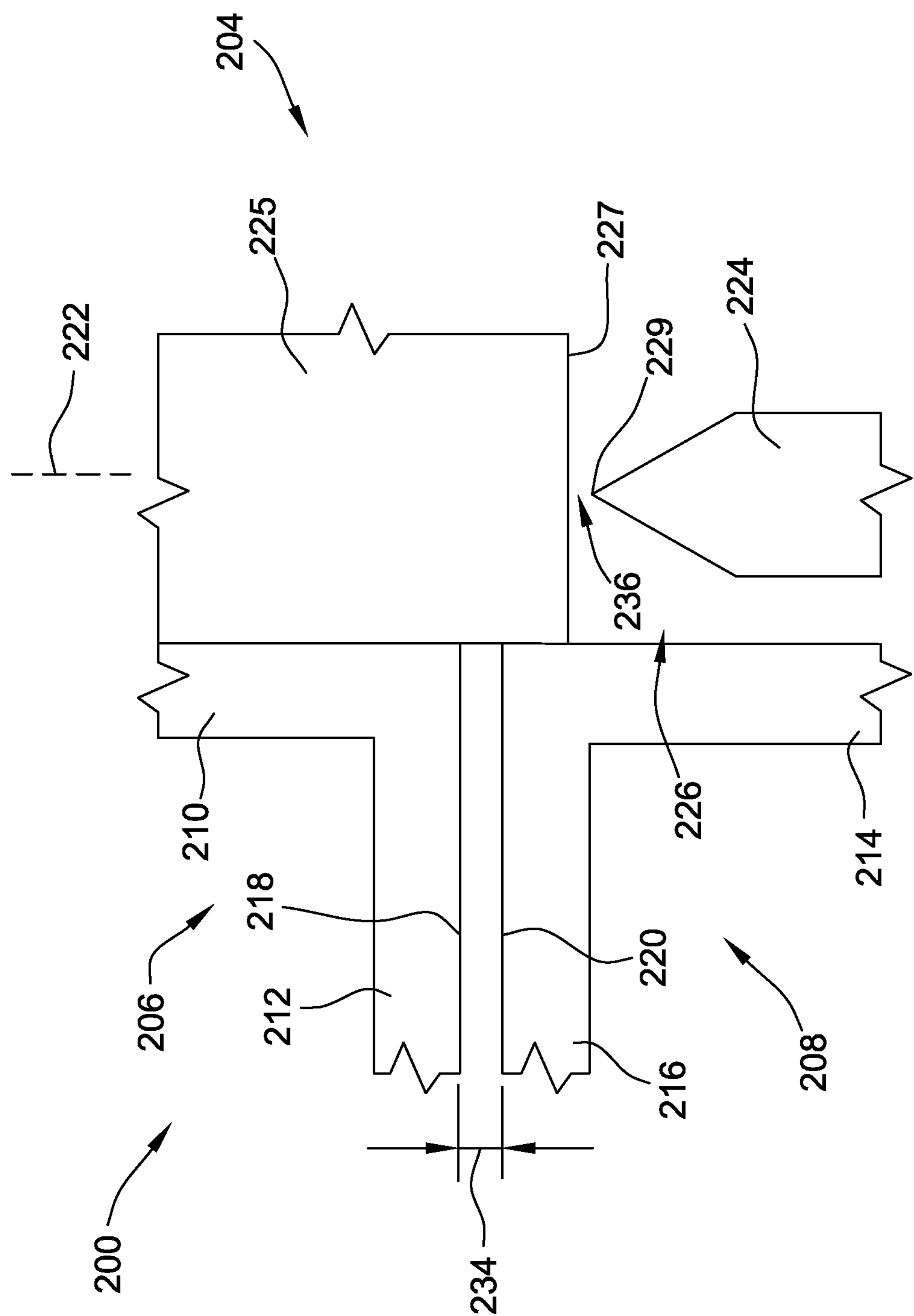
FIG. 5 is an enlarged cross-sectional view of the hydrodynamic bearing assembly shown in FIG. 4 in an operational mode.

FIG. 4 is a cross-sectional view of another embodiment of a hydrodynamic bearing assembly 200 in a non-operational mode 202, and FIG. 5 is an enlarged cross-sectional view of the portion hydrodynamic bearing assembly indicated by box 5-5 in FIG. 4 in an operational mode 204. In the exemplary embodiment, assembly 200 includes a first member 206 positioned adjacent to a second member 208. First member 206 includes a body portion 210 and a plate 212 coupled to body portion 210. A bore 211 is defined through both body portion 210 and plate 212. Similarly, second member 208 includes a body portion 214 and a plate 216 coupled to body portion 214. Plate 212 includes a first engaging surface 218 that is positioned adjacent a second engaging surface 220 of plate 216. In the non-operational mode, both first member 206 and second member 208 are stationary. However, in the operational mode, first member 206 rotates about an axis 222, and second member 208 remains stationary. The rotation of first member 206 pressurizes a fluid (not shown) between surfaces 218 and 220 and causes first member 206 to move axially away from second member 208.

In the exemplary embodiment, assembly 200 also includes a spacer member 224 coupled within a bore 226 defined through body 214 and plate 216 of second member 208. Furthermore, first member 206 includes a shaft 225 coupled within bore 211. As shown in FIG. 2, shaft 225 extends beyond first engaging surface 218 and into bore 226 of second member 208 such that an end surface 227 of shaft 225 is positioned within bore 226. Alternatively, shaft 225 terminates before reaching first engaging surface 118 such that end surface 227 is positioned within bore 211. Generally, shaft 225 extends any length that facilitates operation of bearing assembly 200 as described herein.

In the exemplary embodiment, spacer member 224 engages first member 206 to define a first gap 228 between surfaces 218 and 220 in the non-operational mode. More specifically, a tip 229 of spacer member 224 engages shaft 225 of first member 206 such that spacer member 224 and shaft 225 contact each other when assembly 200 is in the non-operational mode. Even more specifically, tip 229 of spacer member 224 engages end surface 227 of shaft 225 such that spacer member 224 and shaft end surface 227 contact each other when assembly 200 is in the non-operational mode. As such, when members 206 and 208 are stationary, in the non-operational mode, spacer member 224 spaces apart engaging surfaces 218 and 220 such that gap 228 is defined therebetween. Accordingly, spacer member 224 receives the axial load within bearing assembly 200 rather than the axial load being imparted onto engaging surfaces 218 and 220. In the exemplary embodiment, spacer member 224 includes a jewel bearing. Alternatively, spacer member 224 includes any type of spacer that facilitates operation of bearing assembly 200 as described herein.

When bearing assembly 200 shifts from non-operational mode 202 to operational mode 204, as shown in FIG. 5, first member 206 begins to rotate about axis 222. Gap 228, created by spacer member 224, prevents first engaging surface 218 from contacting and rubbing against second engaging surface 220. Furthermore, spacer member 224 supports first member 206 for a short duration in operational mode 204 until first member 206 reaches a speed that causes first member to move farther away from second member 208. As such, spacer member 224 keeps engaging surface 218 and 220 separate during initial start-up of bearing assembly 200, thereby reducing initial spinning torque and wear on plates 212 and 216 caused by friction in some known bearing assemblies.

As described herein, in the operational mode 204, rotation of first member 206 pressurizes the fluid within bearing assembly 200, between surfaces 218 and 220, and causes first member 206 to "lift" or move away from second member 208. As such, a second gap 234 is formed between first engaging surface 218 and second engaging surface 220 that is larger than first gap 228 (shown in FIG. 4). Furthermore, the rotational lifting of first member 206 also defines a third gap 236 between spacer member 224 and first member 206. More specifically, third gap 236 is defined between spacer member 224 and shaft 225. Even more specifically, third gap 236 is defined between spacer member tip 229 and end surface 227 of shaft 225.

In the exemplary embodiment, in operational mode 204, shaft 225 and first engaging surface 218 of first member 206 are spaced away from tip 229 of spacer member 224 and second engaging surface 220 of second member 208, respectively. As such, in operational mode 204, the axial load is carried by first member 206, second member 208, and the pressurized fluid between engaging surfaces 218 and 220.

Figure 6:
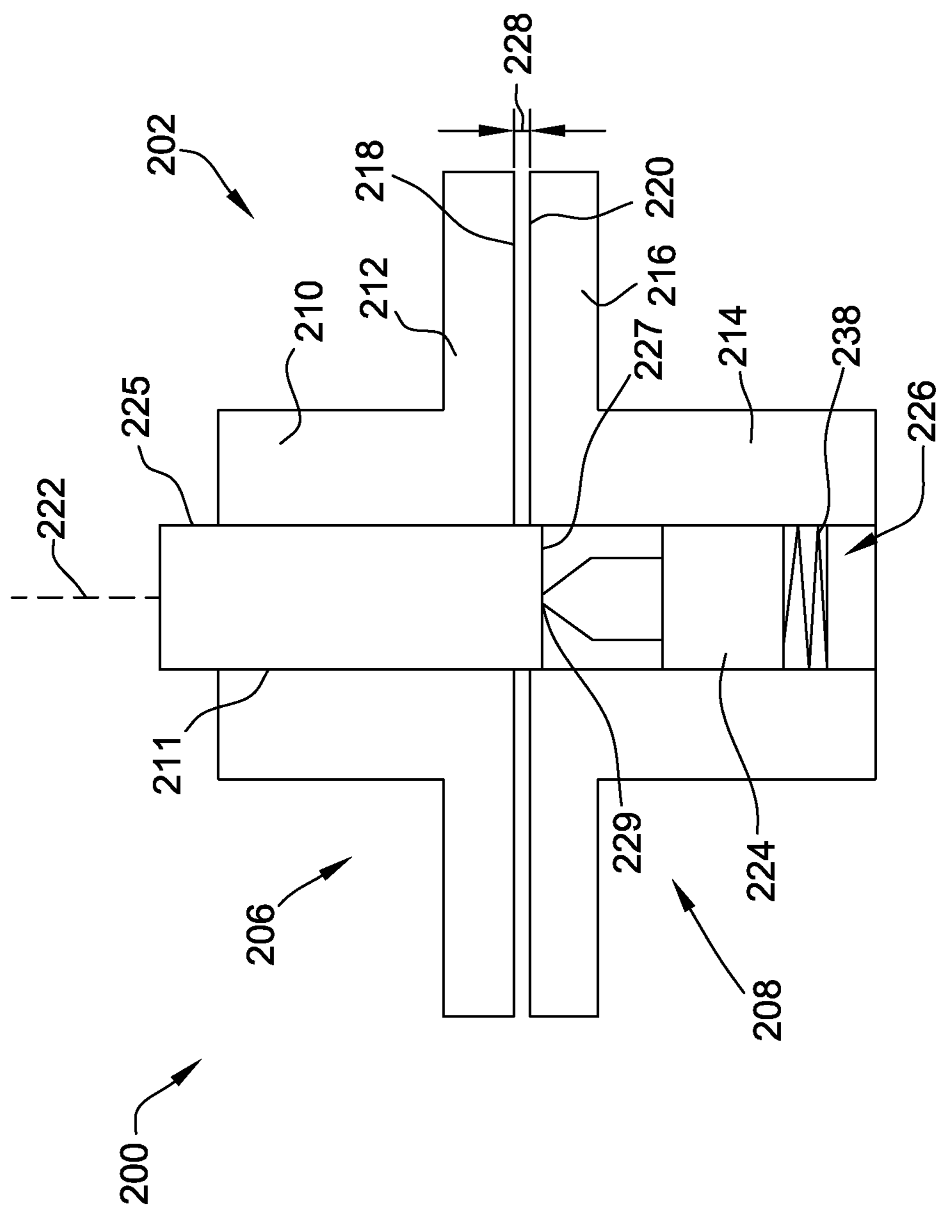
FIG. 6 is a cross-sectional view of an alternative embodiment of a hydrodynamic bearing assembly.

FIG. 6 is a cross-sectional view of a hydrodynamic bearing assembly 200 in non-operational mode 202 and including a biasing mechanism 238. As shown in FIG. 6, biasing mechanism 238 is positioned within bore 226 and is coupled to spacer member 224. Biasing mechanism 238 supports spacer member 224 within bore 226 such that when first member 206 is positioned adjacent second member 208, biasing mechanism 238 compresses to receive at least a portion of the axial load carried by spacer member 224. More specifically, the axial load of first member 206 imparted on spacer member tip 229 by shaft 225 causes biasing mechanism 238 to compress. Such compression causes spacer member 224 to move a distance into bore 226 while still maintaining first gap 228 between surfaces 218 and 220. As rotation begins in the operational mode 204 and first member 206 moves away from second member 208, the axial load on spacer member 224, and biasing mechanism 238, is decreased such that biasing mechanism 238 extends from its compressed state and spacer member 224 moves axially within bore 226. As the rotational speed of first member 206 increases, the distance between surfaces 218 and 220 continues to increase until first member 206 lifts away from spacer member 224 to define third gap 236 (shown in FIG. 5.

Although biasing mechanism 238 is shown and described as a component of bearing assembly 200, it is contemplated that bearing assembly 100 (shown in FIGS. 1-3) may also include biasing mechanism 238 coupled to spacer member 124 that carries at least a portion of the axial load imparted onto spacer member 124 by engaging surface 118 rather than by shaft 225, as in bearing assembly 200.

The apparatus, methods, and systems described herein provide a hydrodynamic bearing assembly having reduced wear and increased service lifetime. More specifically, the spacer member described herein facilitates defining a gap between opposing engaging surfaces of the bearing members when the bearing members are stationary and during relatively low speed rotation. The gap between the engaging surfaces prevents the surfaces from contacting each other at initial start-up. As such, the bearing assembly described herein does not generate high frictional forces or torque at start-up. Accordingly, the bearing members have an increased service lifetime and also generate less noise and vibrations as compared to at least some known hydrodynamic bearing assemblies. Once the rotating bearing member reaches a certain speed, it lifts away from the spacer member to increase the size of the gap between opposing engaging surfaces and to define a gap between the spacer member and the rotating member. As such, in the operational mode, the bearing members do not contact each other and the axial load is carried by the pressurized fluid layer between the two bearing members.

Exemplary embodiments of the hydrodynamic bearing assembly are described above in detail. The hydrodynamic bearing assembly and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A hydrodynamic bearing assembly comprising:

a first member comprising a first engaging surface, wherein said first member is stationary in a non-operating mode of said bearing assembly and wherein said first member rotates about an axis in an operational mode of said bearing assembly, wherein said first member comprises a first bore and a shaft positioned within said first bore, said shaft comprising an end surface;

a second member comprising a second bore and a second engaging surface positioned adjacent said first engaging surface, wherein said second member is stationary in both the non-operating mode and the operational mode of said bearing assembly; and a spacer member positioned within said second bore and configured to engage said shaft end surface to define a first gap between said first engaging surface and said second engaging surface in the non-operational mode.

2. The hydrodynamic bearing assembly in accordance with claim 1, wherein a second gap is defined between said first engaging surface and said second engaging surface in the operational mode, said second gap being larger than said first gap.

3. The hydrodynamic bearing assembly in accordance with claim 2, wherein said spacer member is spaced from said first member in the operational mode such that a third gap is defined between, said spacer member and said first member.

4. The hydrodynamic bearing assembly in accordance with claim 1, wherein said spacer member engages said shaft end surface in said non-operational mode.

5. The hydrodynamic bearing assembly in accordance with claim 4, wherein said spacer member is spaced from said shaft end surface in the operational mode.

6. The hydrodynamic bearing assembly in accordance with claim 1, wherein said spacer member is spaced from said first engaging surface in the operational mode and in the non-operational mode.

7. The hydrodynamic bearing assembly in accordance with claim 1, wherein shaft extends into said second bore in the operational mode.

8. The hydrodynamic bearing assembly in accordance with claim 7, wherein shaft extends into said second bore in the non-operational mode.

9. The hydrodynamic bearing assembly in accordance with claim 1, wherein said shaft extends at least partially into said first gap.

10. The hydrodynamic bearing assembly in accordance with claim 1, wherein said spacer member comprises a jewel bearing.

11. The hydrodynamic bearing assembly in accordance with claim 1, wherein said second member comprises a biasing mechanism positioned within said second bore and coupled to said spacer member.

12. The hydrodynamic bearing assembly in accordance with claim 11, wherein said biasing member receives at least a portion of an axial load imparted by said first member on said spacer member in the non-operational mode.

13. A method of assembling a bearing assembly, said method comprising:

providing a first member having a first engaging surface, wherein the first member is stationary in a non-operating mode of the bearing assembly and wherein the first member rotates about an axis in an operational mode of the bearing assembly;

coupling a shaft within a first bore defined through the first member, wherein the shaft includes an end surface spaced from the first engaging surface;

positioning a second member having a second engaging surface adjacent the first member; wherein the second member is stationary in both the non-operating mode and the operational mode of the bearing assembly; and coupling a spacer member within a second bore defined in the second member such that the spacer member engages the shaft end surface in the non-operational mode to define a first gap between the first engaging surface and the second engaging surface.

14. The method in accordance with claim 13, wherein coupling the spacer member within the second bore comprises coupling the spacer member such that a second gap is defined between the first engaging surface and the second engaging surface in the operational mode, wherein the second gap is larger than the first gap.

15. The method in accordance with claim 13, wherein coupling the spacer member within the second bore comprises coupling the spacer member such that a third gap is defined between the spacer member and the first member in the operational mode.

16. The method in accordance with claim 13, wherein coupling the spacer member within the second bore comprises coupling the spacer member to engage the shaft end surface in the non-operational mode and such that the spacer member is spaced from the shaft end surface in the operational mode.

17. The method in accordance with claim 13, wherein coupling the shaft within the first bore comprises coupling the shaft such that the shaft extends into the second bore in the operational mode.

18. The method in accordance with claim 17, wherein coupling the shaft within the first bore comprises coupling the shaft such that the shaft extends into the second bore in the non-operational mode.

19. The method in accordance with claim 13, wherein coupling the spacer member within the second bore comprises coupling the spacer member within the second bore such that the spacer member is spaced form the first engaging surface in the operational mode and in the non-operational mode.

20. The method in accordance with claim 13, wherein coupling the shaft within the first bore comprises coupling the shaft such that the shaft extends at least partially into the first gap.

* * * * *

UNITED STATES PATENT AND TRADEMARK OFFICE
CERTIFICATE OF CORRECTION

PATENT NO. : 10,683,888 B2
APPLICATION NO. : 16/141500
DATED : June 16, 2020
INVENTOR(S) : Turner et al.

Page 1 of 1

It is certified that error appears in the above-identified patent and that said Letters Patent is hereby corrected as shown below:

On the Title Page

Item (73), in Assignee, "Regal Beloit America, Inc., Beloit, WI (US)" should be -- Regal Beloit Australia Pty Ltd., Rowville, VIC (AU) and Regal Beloit America, Inc., Beloit, WI (US) --.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*